United States Patent [15] 3,645,857

Fisher et al. [45] Feb. 29, 1972

[54] METHOD OF MAKING PLATED WIRE MEMORY ELEMENT

[72] Inventors: Robert D. Fisher; Ernest W. Jones, both of Woodstock; Eugene A. Grossi, Saugerties, all of N.Y.

[73] Assignee: Ferroxcube Corporation, Saugerties, N.Y.

[22] Filed: May 28, 1969

[21] Appl. No.: 828,674

[52] U.S. Cl. ....................................204/28, 204/40, 204/43

[51] Int. Cl. ......................C23b 5/32, C23b 5/58, C23b 5/68

[58] Field of Search .......................................204/43, 28, 27

[56] References Cited

UNITED STATES PATENTS 3,189,532 6/1965 Chow et al. .............................204/28

3,312,604 4/1967 Wells et al. .........................204/43 X 3,489,660 1/1970 Semienko et al. .......................204/43

3,489,661 1/1970 Chezel et al. ...........................204/43

*Primary Examiner*—F. C. Edmundson

*Attorney*—Frank R. Trifari

[57] ABSTRACT

A method of making a plated wire nondestructive readout memory element in which a beryllium copper wire is first copper coated and electrolytically polished to optimize the surface of the copper coating and then continuously electroplated in a nickel sulfamate-ferrous sulfate bath to produce nonmagnetostrictive permalloy coating thereon.

2 Claims, 4 Drawing Figures

INVENTORS
ROBERT D. FISHER
ERNEST W. JONES
EUGENE A. GROSSI

BY
[signature]
AGENT

INVENTORS
ROBERT D. FISHER
ERNEST W. JONES
EUGENE A. GROSSI

BY
[signature]
AGENT

METHOD OF MAKING PLATED WIRE MEMORY ELEMENT

Our invention relates to a method of manufacturing a plated wire nondestructive readout memory element.

Basically, a plated wire nondestructive readout memory element generally consists of a metal coated 5 mil beryllium-copper wire electroplated with a layer of 81% Ni–19% Fe permalloy of about 10,000 A. thickness or a 80% Ni–17% Fe–3% Co composition layer about 10,000 A. in thickness. The magnetic easy axis is oriented around the circumference of the wire in a closed flux configuration by means of a magnetic field due to current in the wire during the plating operation. The resultant low demagnetization value in the remanent state permits relatively thick films to be used. In construction or fabrication of a wire memory, the wire is used as the digit and sense line and is cross orthogonally by word lines and a bit is stored under each intersection with a word line.

Many problems exist in continuous wire memory device manufacture. The wire is electroplated in a continuous manner and many variables and problems associated with plating techniques are unknown or inadequately controlled and, consequently, the yield associated with continuous electroplated permalloy wire nondestructive readout memory devices is relatively low. Improvements in the yield must result from a continuous electrodeposition process with precise control over electrodeposition parameters associated with the physical properties and, consequently, magnetic properties of the plated wire such as skew, dispersion, anisotropy, coercive force and uniformity. Critical physical parameters associated with the magnetic properties of plated wire are substrate, alloy composition, internal stress, crystal size and orientation. The alloy composition determines the magnetostriction characteristics of the subsequent deposit. The magnetostriction must be near zero and, consequently, in nickel-iron permalloy films, the composition must be 81% Ni–19% Fe. The electroplated alloy composition must be constant while plating from an electrolyte which must be stable in order to maintain a constant composition. The electrolyte solution must be precisely controlled with respect to temperature, pH, current density, agitation and the electrolyte must be stable, e.g., the electrolyte must be such that substantially no precipitation of iron occurs with time thereby altering the subsequent composition of the deposit. In addition, the electrolyte must be stable over a wide temperature range from room temperature to at least the operational temperature, e.g., cooling of the electrolyte to room temperature must not result in any irreversible changes in the electrolyte composition. The internal stress characteristics of the deposited permalloy film from the electrolyte must be minimized in order to prevent interactions with any small magnetostriction or any local and microscopic variations in magnetostrictive characteristics. This is necessary to prevent any changes in magnetic properties such as coercive force which could result from a stress relief which might occur with temperature changes in the memory either internal or external. Thus, the electrolyte used to deposit or manufacture wire memory components must be (1) stable with respect to time and temperature, and (2) capable of providing permalloy deposits with low internal stress.

The basis wire generally used for the manufacture of plated wire is 5 mil beryllium-copper. This wire is generally utilized due to its straightness when removed from a reeled condition, tensile strength, and appropriate resistance per unit length. However, such wire is drawn from relatively large diameter wire by means of appropriate dies and annealed for tensile strength. Consequently, the surface of such wire as supplied by manufacturers is highly scratched, pitted, and nonuniform. In order to minimize this problem, the beryllium-copper wire is electropolished to remove scratches, die marks, etc. An alternate approach to obtaining a uniform surface is to electroplate a leveling copper or other metal over the surface of the beryllium-copper wire. Uniform surface texture is essential in obtaining uniform composition, controlled crystallite size and uniform deposit thickness during electroplating. Thus, an improvement in basis wire processing coupled with improvement in electrolyte stability is essential in obtaining consistent and uniform permalloy deposits for nondestructive readout wire memory devices with a high yield.

It is a principal object of our invention to provide a method of manufacturing a plate wire nondestructive readout memory which results in a high yield of electroplated permalloy wire for such memory applications.

Further objects will appear as the specification progresses.

In accordance with the invention, we have found that appropriate substrate processing to eliminate scratches, die marks, etc., coupled with an electrolyte which is extremely stable with respect to decomposition with temperature and time are the significant features of the process.

The significant improvement in basis wire preparation involves (1) copper plating the beryllium-copper wire followed by (2) electropolishing the copper coated beryllium-copper wire for subsequent continuous deposition of permalloy. The significant improvement in the electrolyte for deposition of permalloy involves a combination of nickel sulfamate and ferrous sulfate with naphthalene trisulfonic acid or other suitable stress reducer. Combining the basis wire processing with the electrolyte provides a process for the manufacture of plated wire with a higher yield than heretofore possible with conventional wire-processing and electroplating techniques.

The invention will be described with reference to the accompanying drawing in which.

Figure 1:
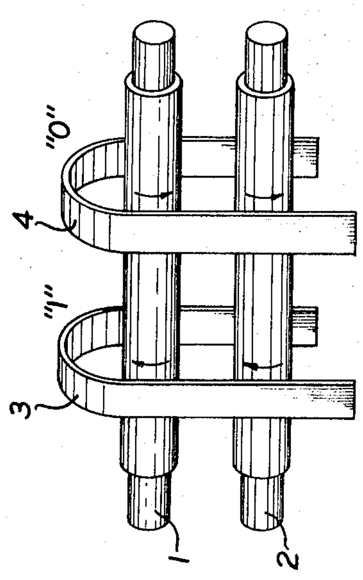
FIG. 1 shows a portion of a plate-wire memory.

The memory shown in FIG. 1 comprises a pair of sense and digit lines 1 and 2 consisting of a metal coated 5 mil beryllium-copper wire electroplated with an 81% Ni–19% Fe layer of permalloy of about 10,000 A. thickness. The magnetic easy axis is oriented around the circumference of the wire in a closed flux configuration by means of a magnetic field due to current in the wire during the plating operation. The resultant low demagnetization value in the remanent state permits relatively thick films to be used.

The wire are crossed orthogonally by word straps 3 and 4 and a bit is stored under each word line.

The operation of a plated wire as a memory element is accomplished by utilizing current in the word strap 3 or 4 to create a magnetic field perpendicular to the magnetization and current down the wire 1 or 2 to cause a field antiparallel to the magnetization. Writing is caused by the application of a write current pulse (word line) resulting in the magnetization vector rotating into the hard or longitudinal direction of the wire followed by a digit current pulse of the appropriate polarity to cause the magnetization to continue to move antiparallel to the previously stored circumferential direction. Nondestructive read is accomplished by application of a word current causing the magnetization to rotate toward the hard direction with the polarity of the output signal identifying the stored bit, and the central Be-Cu wire serving as the sense line. Upon termination of the read current (word strap), the magnetization returns to its original state, i.e., a nondestructive read.

Figure 2:
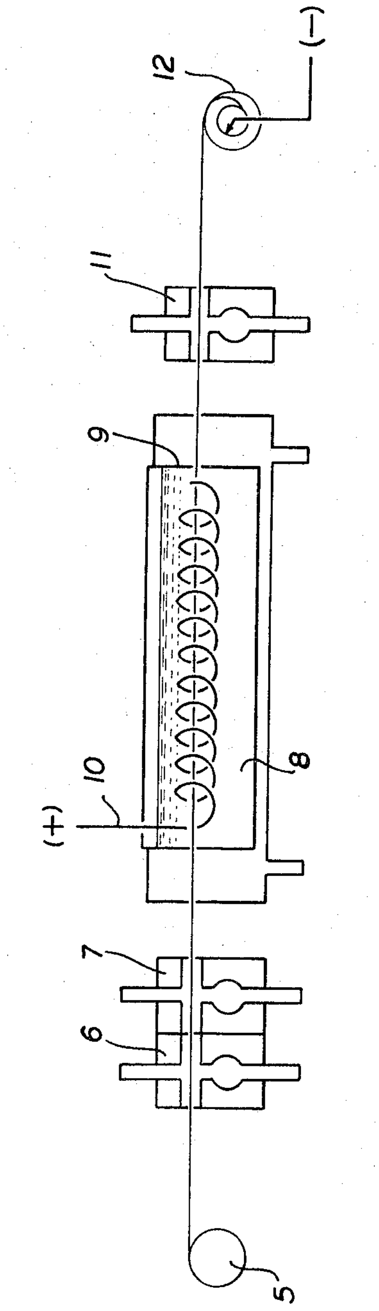
FIG. 2 shows an apparatus for copper-plating the beryllium-copper wire.

In FIG. 2, beryllium-copper wire from a supply reel 5 passes into a cleaning bath 6 consisting of a sodium alkyl napthalene sulfonate solution containing phosphoric acid and a wetting agent such as sodium lauryl sulfate, or a proprietary agent such as a 30 percent solution of Oakite 33, a cleaning agent manufactured by Oakite Products, Inc., Berkley Heights, New Jersey. The bath is maintained preferably at a temperature of about 55° C. and the flow rate about 1 liter/min. After passing through the cleaning bath, the wire is rinsed in deionized water 7 (flow rate approximately one-half liter/min.) and passes into a copper plating bath 8 containing copper cyanide at a temperature between 55° and 65° C. Tank 9 is preferably nonmetallic, e.g., plexiglass or polyvinylchloride, has a length of about 20 inches, a width of about 2 inches, and a depth of about 2 inches. Anode 10 is a copper spiral.

With a voltage of 0.9–1.0 volt between the anode and wire, a current of about 60 ma. and a wire speed of 4 to 8 in./min., the wire is copper plated and rinsed in bath 11 of deionized water before being wound on takeup reel 12.

Figure 3:
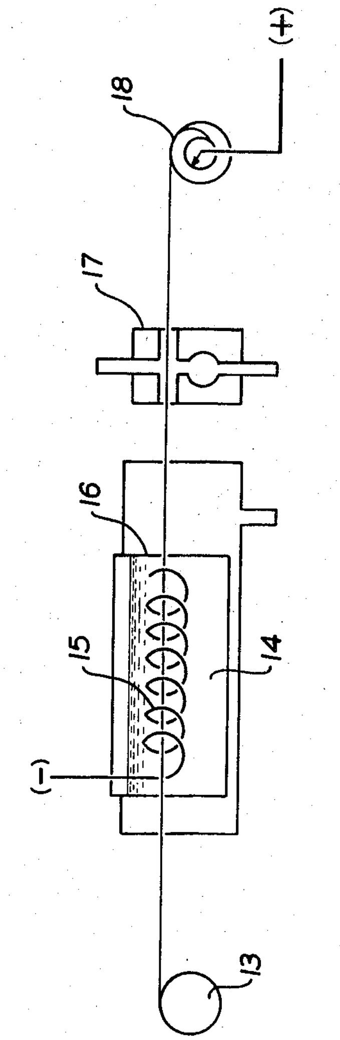
FIG. 3 shows an apparatus for electropolishing the plate wire.

In the next step of the process, the plated wire is electropolished to eliminate scratches and die marks producing a smooth surface texture. This is done as shown in FIG. 3 where the plated wire taken from supply reel 13 is electropolished in a bath 14 containing phosphoric acid ($H_3PO_4$) or phosphoric acid and copper sulfate at a temperature between 55° C and 58° C. With a voltage of 1.5 to 2.5 volts between copper spiral cathode 15 and the wire, a current of 85–100 ma. and a wire speed of about 15 in./min. in stainless steel tank 16, length 4 inches, width 2 inches and depth 2 inches, the wire is polished and rinsed in bath 17 of deionized water before being wound on takeup reel 18.

Figure 4:
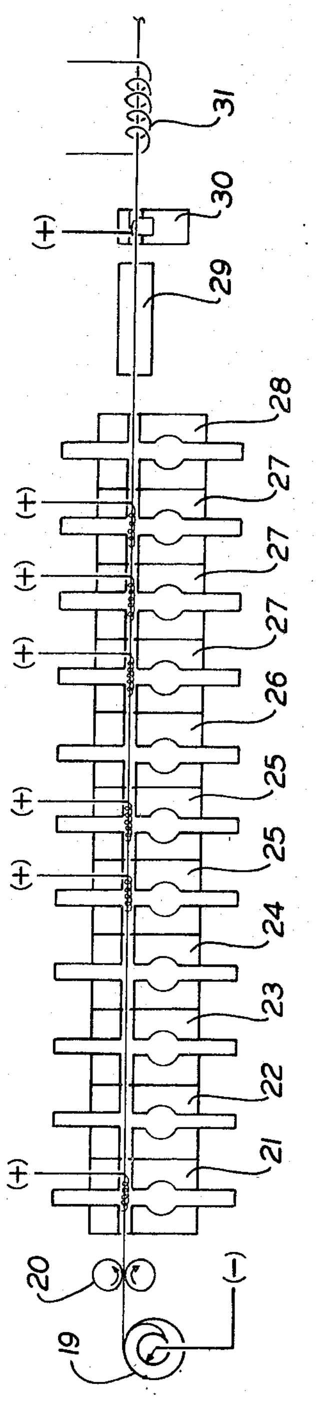
FIG. 4 shows an apparatus for the continuous deposition of permalloy onto the plate wire.

The electropolished copper-plated wire is now ready to be plated with permalloy as shown in FIG. 4 utilizing, for example, a modular system for the continuous electrolytic deposition of wire components disclosed in U.S. Pat. No. 3,399,855. The wire is taken from supply reel 19 by a drive mechanism 20 and pushed at a speed of 5 to 10 in./min. It is first subjected to a cleaning bath 21 containing an alkaline electrocleaning solution containing sodium hydroxide, trisodium phosphate, and sodium alkyl napthalene sulfonate, or Turko Porokleen (52 g./liter). The latter is a product of Turko Products, Inc., Wilmington, California. This solution is operated at a temperature of 65° to 75° C. With a current density of 120–140 amps./ft., a flow rate of 500 to 800 cc./min., the wire is electrocleaned, rinsed in deionized water 22, treated at 23 in 10% $H_2SO_4$ (by volume) at room temperature at a pH of approximately 1.0 with a flow rate of approximately 500 cc./min., rinsed in deionized water 24, copper-plated in a solution 25 containing 25 to 30 g./liter of Cu CN, 30 to 40 g./liter of Na CN and 15 to 35 g./liter of Rochelle Salt at a temperature of 50° C, a pH of 9 to 10, a flow rate of about 1.0 liter/min. and a current density of 200 to 250 amps./ft.$^2$ and rinsed again in deionized water 26.

The wire is now plated with permalloy in plating bath 27 containing 70 to 85 g./liter of nickel metal as sulfamate, 42 to 48 g./liter boric anhydride ($H_3BO_3$), 1.4 to 2.0 g./liter of iron as $FeSO_4 \cdot 6H_2O$ and 15 to 20 g./liter napthalene trisulfonic acid (trisodium salt) at a temperature of 50° to 70° C, a pH between 2.0 and 3.0, a flow rate of about 1.0 liter/min. and a current density of 80 to 100 amps./ft.$^2$. After this plating operation the wire is rinsed in deionized water 28, and, if desired, heat treated in furnace 29 (length 4 to 10 inches) at not more than about 300° C. During the entire process, a current of about 1 amp. is passed through the wire via mercury contact 30 creating a magnetic field around the wire to establish a circumferential orientation of the magnetization.

The magnetic properties of the wire are tested on an automatic tester shown diagrammatically at 31 and cut to appropriate length, for example, 20 inches.

Utilizing the processing described above, the wire was found to have a coercive force of about 2.50 to 3.1, an anisotropy less than 6 oe., zero magnetostriction and a skew and dispersion less than 1°.

The plated wire when tested under worst case adjacent but conditions, typically shows the following bipolar outputs:

| | | |
|---|---|---|
| Amplitude | = | ± 6 mv. typical<br>± 3 mv. minimum |
| Peak time, $t_p$ | = | 35 ns. nominal |
| Switch time, $t_s$ | = | 70 ns. nominal |

The worst case test pattern of adjacent bit disturbs consists of the following four steps:

1. Writing a History

The bit location under test, and adjacent bit locations, are loaded $10^5$ times with the complement of the desired information ("1" or "0"), the word and bit currents being at their high values.

2. Loading the Test Bit

The bit location under test is loaded with the desired information ("1" or "0"), the word and bit currents being at their low values.

3. Disturbing the Test Bit

The bit location under test is read $10^5$ times and the adjacent bit locations are loaded $10^5$ times with the complement of the desired information, the word and bit currents being at their high values.

4. Checking the Test Bit

The bit location under test is read and the amplitude of the output signal is noted, the word current being at its low value.

Test conditions are as follows:

Mode of Operation:

NDRO - Double Pulse Write

Word Current (Unipolar):

Amplitude: Read = Write = 900 ma. nominal, 90 to 90 percent

Digit Current (Bipolar)

| | | | |
|---|---|---|---|
| Amplitude | = | ± 40 ma. nominal, | tolerance ± 10% |
| Overlap | = | 70 ns. minimum | |
| Dwell time | = | 20 ns. minimum | |

Word strap dimensions for this example are:

| | |
|---|---|
| Word strap width | 0.045" |
| Center to center distance | 0.060" |
| Distance between upper and lower word straps | 0.010" |

While the invention has been described with reference to a particular embodiment and application thereof, other modifications will be apparent to those skilled in this art without departing from the scope of the invention which is defined in the appended claims.

What is claimed is:

1. In the process of manufacturing a nondestructive readout ferromagnetic wire memory element, the steps of depositing a copper layer over a beryllium copper wire element, thereafter electropolishing said copper layer in a solution of phosphoric acid to eliminate imperfections therein, applying a second copper layer having a uniform surface texture over the electropolished copper layer, and thereafter electrodepositing a layer of permalloy from a solution containing nickel sulfamate, ferrous sulfate and naphthalene trisulforic acid as a stress reducer in which the pH of the permalloy plating solution is between 2.0 and 3.0 and the temperature is about 60° to 70° C.

2. A process as claimed in claim 1 in which the solution contains between 70 to 85 g./liter of nickel metal as sulfamate, 42 to 48 g./liter of boric anhydride, 1.4 to 2.0 g./liter of iron as $FeSO_4 \cdot 6H_2O$ and, 15 to 20 g./liter of napthalene trisulfonic acid trisodium salt.

* * * * *